(12) United States Patent
Spangler

(10) Patent No.: US 11,022,155 B2
(45) Date of Patent: Jun. 1, 2021

(54) HYDRAULIC CONTROL SYSTEM HAVING FOUR-POSITION MAIN PRESSURE REGULATOR

(71) Applicant: BorgWarner Inc., Auburn Hills, MI (US)

(72) Inventor: Christopher Spangler, Rochester Hills, MI (US)

(73) Assignee: Borg Warner Inc., Auburn Hills, MI (US)

( * ) Notice: Subject to any disclaimer, the term of this patent is extended or adjusted under 35 U.S.C. 154(b) by 213 days.

(21) Appl. No.: 16/174,430

(22) Filed: Oct. 30, 2018

(65) Prior Publication Data

US 2019/0136878 A1  May 9, 2019

Related U.S. Application Data

(60) Provisional application No. 62/581,361, filed on Nov. 3, 2017.

(51) Int. Cl.
*F15B 13/06* (2006.01)
*F16H 61/00* (2006.01)
(Continued)

(52) U.S. Cl.
CPC .............. *F15B 13/06* (2013.01); *F15B 11/17* (2013.01); *F16H 57/0435* (2013.01); *F16H 57/0439* (2013.01); *F16H 61/0021* (2013.01); *F16H 61/0025* (2013.01); *F16H 61/0031* (2013.01); *F16H 61/0251* (2013.01);
(Continued)

(58) Field of Classification Search
CPC ............. F16H 57/0435; F16H 57/0439; F16H 61/0021; F16H 61/0025; F16H 61/0031; F16H 2061/0037; F16H 61/0251; F16H 2061/0253; F16H 61/0269; F16H 2061/0279; F15B 11/17; F15B 2211/20576; F15B 13/06; Y10T 137/86131; Y10T 137/86493; Y10T 137/86509; F16D 48/02; F16D 2048/0221; F16D 2048/0236; F16D 2048/0287; F16D 2048/029; F16D 2048/0293; F16D 48/06; G05D 16/04
See application file for complete search history.

(56) References Cited

U.S. PATENT DOCUMENTS 4,321,793 A * 3/1982 Uranaka .................... B60T 1/08
60/358
6,205,780 B1 * 3/2001 Zervas .................... F15B 11/08
60/421

(Continued)

FOREIGN PATENT DOCUMENTS

CN  101749420 A  6/2010

OTHER PUBLICATIONS

English language abstract and machine-assisted English translation for CN 101749420 extracted from espacenet.com database on Nov. 29, 2018, 11 pages.

*Primary Examiner* — Richard M Lorence
(74) *Attorney, Agent, or Firm* — Howard & Howard Attorneys PLLC

(57) ABSTRACT

A hydraulic control system for use with a transmission of a vehicle powertrain system includes a four-position main pressure regulator that selectively combines input fluid flow and pressure from two independent fluid sources and provides output fluid flow to two dependent sources of the transmission.

15 Claims, 3 Drawing Sheets

(51) Int. Cl.
*F16H 57/04* (2010.01)
*F15B 11/17* (2006.01)
*F16H 61/02* (2006.01)
*G05D 16/04* (2006.01)

(52) U.S. Cl.
CPC .... *G05D 16/04* (2013.01); *F15B 2211/20576* (2013.01); *F16H 2061/0037* (2013.01)

(56) References Cited

U.S. PATENT DOCUMENTS

| | | |
|---|---|---|
| 7,823,473 B2 | 11/2010 | Uberti et al. |
| 8,375,816 B2 | 2/2013 | Braford, Jr. |
| 8,429,993 B2 * | 4/2013 | Garabello ........... F16H 61/2807 74/335 |
| 2017/0159678 A1 * | 6/2017 | Peterson ............... E02F 9/2217 |

* cited by examiner

HYDRAULIC CONTROL SYSTEM HAVING FOUR-POSITION MAIN PRESSURE REGULATOR

CROSS REFERENCE TO RELATED APPLICATIONS

This application claims the benefit of U.S. Patent Application No. 62/581,361 filed on Nov. 3, 2017, the disclosure of which is herein incorporated by reference in its entirety.

BACKGROUND OF INVENTION

Field of Invention

The present invention relates generally to powertrain systems and, more specifically, to a hydraulic control system having a four-position main pressure regulator for regulating fluid pressure for a transmission of a powertrain system.

Description of the Related Art

Conventional vehicle powertrain systems known in the art typically include an engine in rotational communication with a transmission. The engine generates a rotational output that provides a rotational input into the transmission which, in turn, changes the rotational speed and torque generated by the output of the engine through a series of predetermined gearsets in a gearbox to transmit power to one or more wheels of the vehicle, whereby changing between the gearsets enables the vehicle to travel at different vehicle speeds for a given engine speed.

In addition to changing between the gearsets, the transmission is also used to modulate engagement with the engine, whereby the transmission can selectively control engagement with the engine to facilitate vehicle operation. By way of example, torque translation between the engine and the transmission is typically interrupted while a vehicle is parked or idling, or when the transmission changes between the gearsets. In some automatic transmissions, modulation is achieved via a hydrodynamic device such as a hydraulic torque converter. However, in other automatic transmissions, modulation is achieved with one or more electronically and/or hydraulically actuated clutches (sometimes referred to in the art as a "dual clutch" automatic transmission). Automatic transmissions are typically controlled using hydraulic fluid, and include one or more pumps, one or more solenoid valves, and an electronic controller. The pumps provide a source of fluid power to the solenoid valves, which, in turn, are actuated by the controller to selectively direct hydraulic fluid throughout the automatic transmission to control modulation of rotational torque generated by the engine. The solenoid valves are also typically used to change between the gearsets of the transmission, and may be used to control hydraulic fluid used to cool and/or lubricate various components of the transmission in operation.

Depending on the specific configuration of the transmission, the hydraulic control system may direct fluid flow from a first pump through a main line circuit for clutch modulation and/or gear actuation and from a second pump through a second priority circuit for cooling/lubrication. In some hydraulic control systems, a traditional three position regulating valve (controlled by a pilot solenoid) and a separate on/off solenoid and spool valve direct fluid flow from the second pump either into the main line circuit or directly into the secondary priority circuit for cooling/lubrication.

Accordingly, it is desirable to reduce the number of components and cost of the hydraulic control system for the transmission. Thus, there is a need in the art to provide a new main pressure regulator for a hydraulic control system for usage with a transmission that achieves component and cost reduction.

SUMMARY OF THE INVENTION

The present invention provides a hydraulic control system for use with a transmission of a vehicle powertrain system including a four-position main pressure regulator that selectively combines input fluid flow and pressure from two independent fluid sources and provides output fluid flow to two dependent sources of the transmission.

The present invention also provides a method for controlling a hydraulic control system for use with a transmission of a vehicle powertrain system including providing a four-position main pressure regulator and selectively combining input fluid flow and pressure from two independent fluid sources with the four-position main pressure regulator and providing output fluid flow from the four-position main pressure regulator to two dependent sources of the transmission.

One advantage of the present invention is that a new hydraulic control system having a four-position main pressure regulator is provided for a transmission. Another advantage of the present invention is that the four-position main pressure regulator of the hydraulic control system selectively combines input fluid flow and pressure from two independent sources and provides output fluid flow to two dependent sources of the transmission. Yet another advantage of the present invention is that the hydraulic control system having the four-position main pressure regulator allows the outputs of two pumps to be selectively combined and provides output flow to two circuits of the transmission. Still another advantage of the present invention is that the hydraulic control system having the four-position main pressure regulator may be used with a transmission such as a dual clutch automatic transmission to achieve most of the efficiency benefits of a high complexity system. A further advantage of the present invention is that the four-position main pressure regulator reduces cost and complexity of the hydraulic control system for the transmission.

Other objects, features, and advantages of the present invention will be readily appreciated as the same becomes better understood after reading the subsequent description taken in connection with the accompanying drawings.

DETAILED DESCRIPTION OF THE INVENTION

Figure 1:
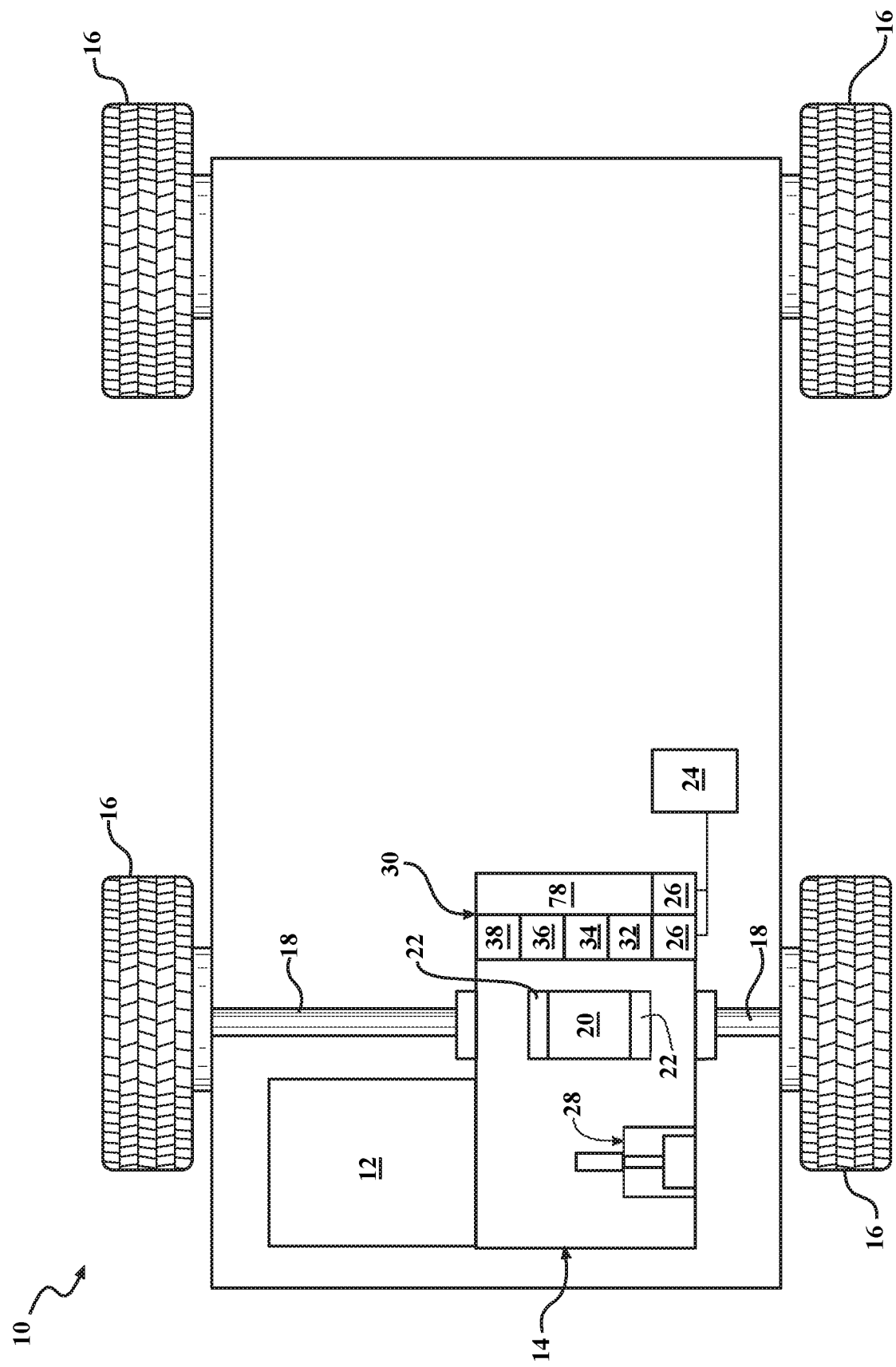
FIG. 1 is a schematic view of one embodiment of a vehicle powertrain system including an automatic transmission and a hydraulic control system, according to the present invention.

Referring now to the figures, where like numerals are used to designate like structure unless otherwise indicated, a vehicle powertrain system is schematically illustrated at 10 in FIG. 1. The powertrain system 10 includes an engine 12 in rotational communication with a transmission such as an automatic transmission 14. The engine 12 generates a rotational output that provides a rotational input into the automatic transmission 14 which, in turn, changes the rotational speed and torque generated by the output of the engine 12 to one or more wheels, generally indicated at 16. To that end, a pair of axle shafts 18 translates rotational torque from the automatic transmission 14 to the wheels 16. It should be appreciated that the engine 12 and the automatic transmission 14 of FIG. 1 are of the type employed in a conventional "transverse front wheel drive" powertrain system 10. It should also be appreciated that the engine 12 and/or automatic transmission 14 could be configured in any suitable way sufficient to generate and translate rotational torque so as to drive the vehicle, without departing from the scope of the present invention.

The automatic transmission 14 multiplies the rotational speed and torque generated by the engine 12 through a series of predetermined gearsets 20 (not shown in detail, but generally known in the art), whereby changing between the gearsets 20 enables the vehicle to travel at different vehicle speeds for a given speed of the engine 12. Thus, the gearsets 20 of the automatic transmission 14 are configured such that the engine 12 can operate at particularly desirable rotational speeds to optimize vehicle performance and efficiency. In addition to changing between the gearsets 20, the automatic transmission 14 is also used to modulate engagement with the engine 12, whereby the transmission 14 can selectively control engagement with the engine 12 to facilitate vehicle operation. By way of example, torque translation between the engine 12 and the automatic transmission 14 is typically interrupted while the vehicle is parked or idling, or when the transmission 14 changes between the gearsets 20. Modulation of rotational torque between the engine 12 and the automatic transmission 14 is achieved with one or more hydraulically-actuated clutch assemblies 22 (not shown in detail, but generally known in the art). It should be appreciated that this configuration is sometimes referred to in the art as a "dual clutch" automatic transmission. An example of a dual clutch automatic transmission is disclosed in U.S. Pat. No. 8,375,816 to Braford, Jr., the disclosure of which is hereby incorporated by reference in its entirety. It should also be appreciated that the automatic transmission 14 is adapted for use with vehicles such as automotive vehicles, but could be used in connection with any suitable type of vehicle.

Figure 2:
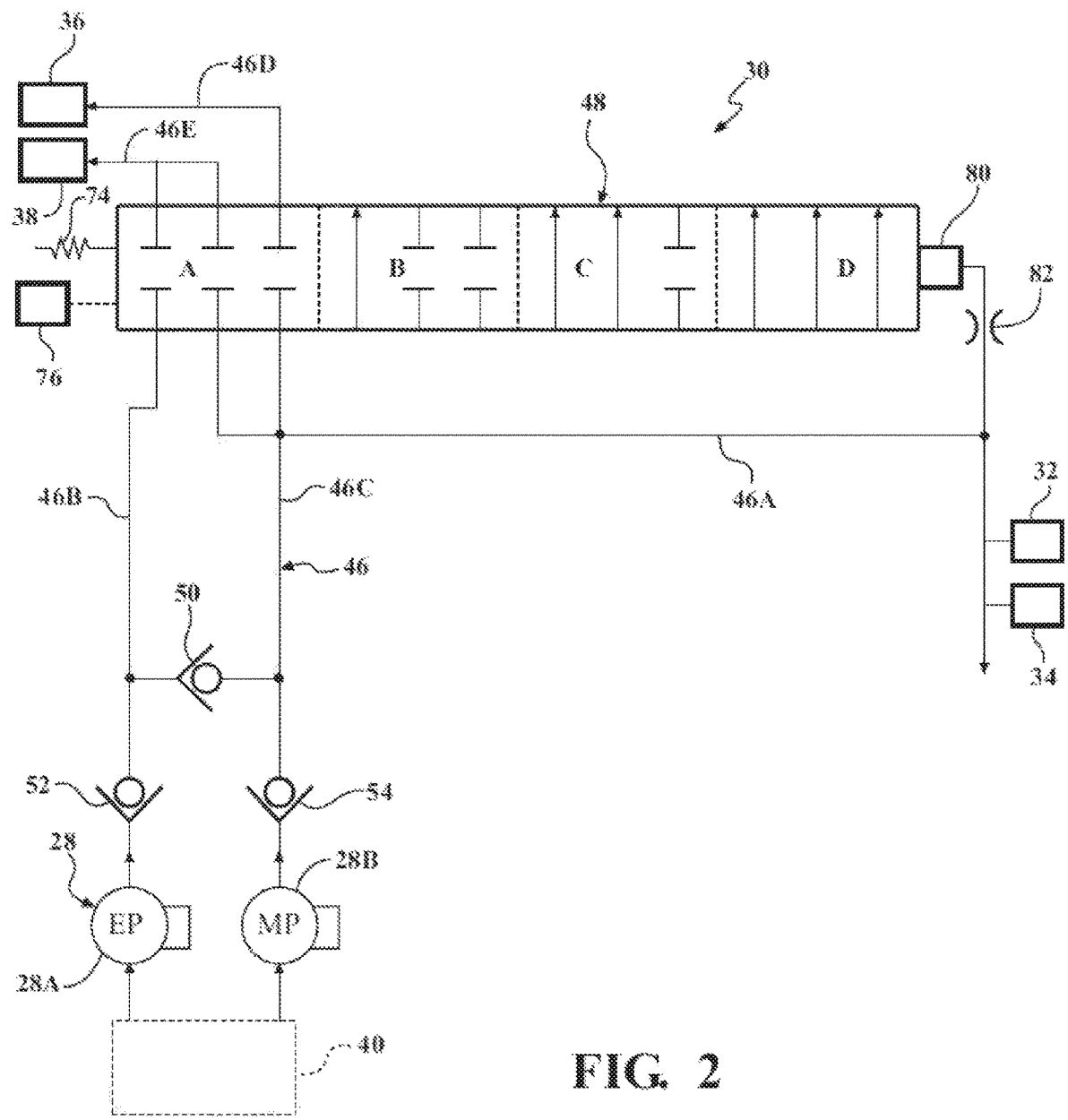
FIG. 2 is a schematic view of one embodiment of the hydraulic control system, according to the present invention, of FIG. 1.

Irrespective of the specific configuration of the powertrain system 10, the automatic transmission 14 is typically controlled using hydraulic fluid. Specifically, the automatic transmission 14 is cooled, lubricated, actuated, and modulates torque using hydraulic fluid. To these ends, the automatic transmission 14 typically includes a controller 24 in electrical communication with one or more solenoids 26 (see FIG. 1) used to direct, control, or otherwise regulate flow of fluid throughout the transmission 14. In order to facilitate the flow of hydraulic fluid throughout the automatic transmission 14, the powertrain system 10 includes a plurality of pumps, generally indicated at 28. In various embodiments, the powertrain system 10 may include at least one pump, for example an electric pump or a mechanical pump, and at least one accumulator, for example a hydraulic accumulator. In one embodiment, the pumps 28 include a first pump 28A and a second pump 28B as illustrated in FIG. 2. In one embodiment, the first pump 28A is an electric pump connected to a source of power such as the controller 24 and the second pump 28*b* is a mechanical pump rotationally coupled to the engine 12. Each pump 28 includes an inlet region or port for receiving fluid to be pumped and an outlet region or port for outputting fluid pumped. It should be appreciated that any combination of pumps 28 that provides two separate outputs may be used.

The pumps 28 are adapted to provide a source of fluid power to the powertrain system 10. Specifically, the pumps 28 provide fluid power to various locations and components of the automatic transmission 14. While the pumps 28 are described herein as providing fluid power to the automatic transmission 14 of the powertrain system 10, those having ordinary skill in the art will appreciate that the pumps 28 could be used in connection with any suitable part of the powertrain system 10 without departing from the scope of the present invention. By way of non-limiting example, the pumps 28 of the present invention could be used to direct or otherwise provide a source of fluid power to the engine 12, a transfer case (not shown, but generally known in the art), or any other powertrain component that utilizes fluid for lubrication, cooling, control, actuation, and/or modulation.

As noted above, the present invention is directed toward a hydraulic control system, according to the present invention and generally indicated at 30, for use with the automatic transmission 14. The hydraulic control system 30 directs or otherwise controls fluid power from the outlet ports of the pumps 28 to the automatic transmission 14. It should be appreciated that the hydraulic control system 30 can be configured in a number of different ways to direct fluid to the automatic transmission 14. It should also be appreciated that the hydraulic control system 30 may be used with other types of transmissions, without departing from the scope of the present invention.

Referring to FIGS. 1 and 2, one embodiment of the hydraulic control system 30, according to the present invention, is shown in connection with the automatic transmission 14. As noted above, the automatic transmission 14 utilizes hydraulic fluid for lubrication, actuation, modulation, and/or control. To that end, the automatic transmission 14 includes a clutch actuation portion or circuit 32, a gear shift actuation portion or circuit 34, a fluid recirculation portion or circuit 36, and a secondary pump portion or priority circuit 38. For example, the secondary pump portion or priority circuit 38 may be a secondary lubrication portion of a priority circuit 38. The clutch actuation circuit 32 is used to selectively actuate the clutch assemblies 22 so as to modulate rotational torque between the engine 12 and the automatic transmission 14. The gear shift actuation circuit 34 is used to selectively switch between the gearsets 20 of the automatic transmission 14. The recirculation circuit 36 is used to recirculate fluid back to the inlet ports of the pumps 28. The secondary priority circuit 38 is used for cooling and/or lubrication to the gearbox and/or other locations throughout the automatic transmission 14, such as shafts, bearings, gears, and the like (not shown in detail, but generally known in the art). Those having ordinary skill in the art will appreciate that there are a number of different ways that the circuits 32, 34, 36, 38 described above could be configured. Moreover, it should be appreciated that the hydraulic control system 30 could be used to direct fluid power to any suitable number of circuits, configured in any suitable way and for any suitable purpose of the powertrain system 10, without departing from the scope of the present invention. Similarly, while the representative embodiments illustrated herein describe the hydraulic control system 30 as used with hydraulic fluid in the automatic transmission 14, those having ordinary skill in the art will appreciate that the hydraulic control system 30 and pumps 28 can be adapted to displace or otherwise direct any suitable type of fluid to any suitable component or system of the powertrain system 10 of any suitable type or configuration without departing from the scope of the present invention.

In one embodiment, the hydraulic control system 30 includes a sump 40 for providing a source of hydraulic fluid to the inlet ports of the pumps 28. More specifically, the sump 40 is adapted to store non-pressurized hydraulic fluid such as oil and is disposed in fluid communication with all inlet ports of the pumps 28. However, while the hydraulic control system 30 depicted herein utilizes a common sump 40 for all inlet ports, it should be appreciated that a plurality of sumps 40 could be utilized. By way of non-limiting example, each inlet port could be disposed in fluid communication with a different sump (not shown, but generally known in the art).

To facilitate the pressure requirements of the circuits 32, 34, 36, 38, the hydraulic control system 30 includes fluid lines, generally indicated at 46, that cooperate with the pumps 28 and the circuits 32, 34, 36, 38. One fluid line 46A of the fluid lines 46, also known as a main line pressure circuit, is disposed in fluid communication with one of the outlet ports of the pumps 28, a four-position main pressure regulator 48 to be described, and the clutch actuation circuit 32 and the gear shift actuation circuit 34. Another fluid line 46B of the fluid lines 46 is in fluid communication with a first source of fluid such as the first pump 28a and the four-position main pressure regulator 48. Yet another fluid line 46C of the fluid lines 46 is in fluid communication with a second source of fluid such as the second pump 28B and the four-position main pressure regulator 48. Still another fluid line 46D of the fluid lines 46 is in fluid communication with the recirculation circuit 36 and the four-position main pressure regulator 48. Yet still another fluid line 46E of the fluid lines 46 is in fluid communication with the secondary priority circuit 38 and the four-position main pressure regulator 48. It should be appreciated that the fluid lines 46 could be defined in any suitable way, disposed in fluid communication with any suitable component or circuit of the hydraulic control system 30, without departing from the scope of the present invention.

In one embodiment, the hydraulic control system 30 further includes a first check valve 50 positioned between the fluid line 46B and the fluid line 46A such that fluid may flow from the first pump 28A to the main line pressure circuit if the pressure in the first pump 28A is equal to or greater than the pressure in the main line pressure circuit. The hydraulic control system 30 also includes a second check valve 52 positioned on the fluid line 46B between the first pump 28A and the four-position main pressure regulator 48 to prevent back flow through the first pump 28A when the first pump 28A is Off. The hydraulic control system 30 further includes a third check valve 54 positioned on the fluid line 46C between the second pump 28B and the four-position main pressure regulator 48 to prevent back flow through the second pump 28B when the second pump 28B is Off. It should be appreciated that other check valves (not shown) may be used on the fluid lines 46, without departing from the scope of the present invention.

Referring to FIG. 2, the hydraulic control system 30 includes a four-position main pressure regulator, generally indicated at 48, interposed in fluid communication between the fluid lines 46A, 46B, 46C, 46D, 46E. The four-position pressure regulator valve 48 directs fluid from the outlet ports of the pumps 28 so as to accommodate the pressure and flow requirements of the circuits 32, 34, 36, 38 and ensure proper operation under different operating conditions of the automatic transmission 14. The four-position main pressure regulator 48 regulates the line pressure of the fluid line 46A in responding to instantaneous clutch actuation and gear shift actuation demand. It should be appreciated that regulating and maintaining the correct line pressure by the four-position main pressure regulator valve 48 ensures the proper operation of the powertrain system 10.

Figure 3:
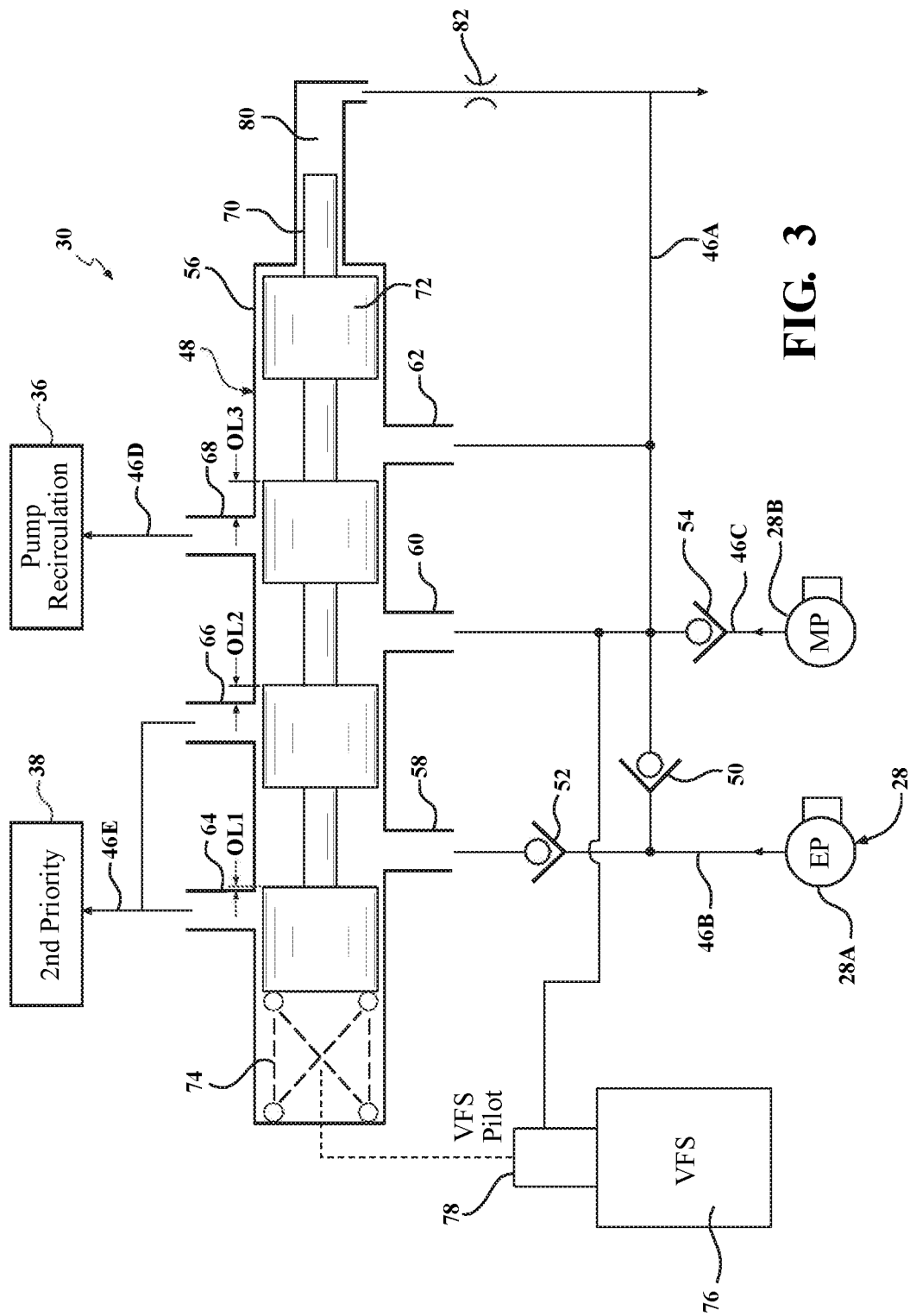
FIG. 3 is a sectional view of a four-position main pressure regulator for the hydraulic control system, according to the present invention, of FIG. 2.

In one embodiment illustrated in FIG. 3, the four-position main pressure regulator 48 includes a housing or valve body 56 having a first inlet port 58 fluidly connected to the first pump 28A, a second inlet port 60 fluidly connected to the second pump 28B, a third inlet port 62 fluidly connected to the second pump 28B, a first outlet port 64 fluidly connected to the second priority circuit 38, a second outlet port 66 fluidly connected to the second priority circuit 38, and a third outlet port 68 fluidly connected to the pump recirculation circuit 36. The four-position main pressure regulator 48 also includes a movable pressure regulating valve or valve member 70 having lands 72 proportionally operable at and between four pressure regulating or nominal positions such as a first nominal position A, a second nominal position B, a third nominal position C, and a fourth nominal position D (See FIG. 2). The four-position main pressure regulator 48 includes a pressure control solenoid 76 such as a variable force solenoid (VFS) to control the pressure regulating valve 70. The four-position main pressure regulator 48 also includes a spring 74 for biasing the regulating valve 70 into the first nominal position A wherein all three inlet ports 58, 60, 62 are blocked by the lands 72 relative to all three outlet ports 64, 66, 68. The four-position main pressure regulator 48 further includes a pilot pressure area or hydraulic inlet 78 acted upon by pressure from the pressure control solenoid 76 for further biasing the pressure regulating valve 70 towards the first nominal position A. The four-position main pressure regulator 48 also includes a feedback area 80 acted upon by the pressure in the fluid line 46A of the main line pressure circuit which urges the pressure regulating valve 70 in the direction of the second, third and fourth nominal positions as the main line pressure increases above a target defined by the spring bias and pilot pressure wherein the second nominal position B opens the inlet port 58 to the outlet port 64, the third nominal position C additionally opens the inlet port 60 to the outlet port 66, and the fourth nominal position D additionally opens the inlet port 62 to the outlet port 68. As illustrated in FIG. 3, the lands 72 overlap (OL) the outlet ports 64, 66, 68 in the nominal positions such that OL1 is less than OL2 and OL2 is less than OL3. It should be appreciated that the four-position main pressure regulator 48 may include an orifice 82 to damp travel of the pressure regulating valve 70.

Specifically, as shown in FIG. 2, the pressure regulator valve 70 valve has four operating or nominal positions. In the first nominal position A, there is no flow through the four-position main pressure regulator 48. In the second nominal position, fluid flows through the four-position main pressure regulator 48 from the first pump 28A to the second priority circuit 38. In the third nominal position C, fluid flows through the four-position main pressure regulator 48 from both the first pump 28A and the second pump 28B into the second priority circuit 38. In the fourth nominal position D, fluid flows through the four-position main pressure regulator 48 from the first pump 28A and the second pump 28B into the secondary priority circuit 36 and flows from the second pump 28B into the pump recirculation circuit 36. It should also be appreciated that the four-position main pressure regulator 48 could be modified to have a different number of positions and different movement through these positions without departing from the scope of the present invention.

In operation of the vehicle, during stop/start engine Off conditions, the first pump 28A is On and the second pump 28B is Off, and the pressure control solenoid 76 is On, the check valve 50 directs fluid from the first pump 28A to the main line pressure circuit due to the pressure difference. During low speed high energy launch conditions, the first pump 28A is On and the second pump 28B is On, and the pressure control solenoid 76 is On, the four-position main pressure regulator 48 directs fluid from the first pump 28A to the second priority circuit 38. During engine Off coasting condition, the first pump 28A is On and the second pump 28B is Off, and the pressure control solenoid 76 is On, the four-position main pressure regulator 48 directs fluid from the first pump 28A to the main line pressure circuit and regulates for the second priority circuit 38. During idle hot gearbox or clutch conditions, the first pump 28A is On and the second pump 28B is On, and the pressure control solenoid 76 is On, the four-position main pressure regulator 48 directs fluid from the first pump 28A to the second priority circuit 38. During electric rear axle drive conditions, the first pump 28A is On and the second pump 28B is Off, and the pressure control solenoid 76 is On, the check valve 50 directs fluid from the first pump 28A to the main line pressure circuit due to the pressure difference and the four-position main pressure regulator 48 regulates the fluid for the second priority circuit 38. It should be appreciated that the pressure control solenoid 76 is On for all operating conditions while regulating at different line pressures in the fluid line 46A of the main line pressure circuit.

As noted above, the hydraulic control system 30 may include a controller 24 in electrical communication with one or more solenoid valves 26, the pressure control solenoid 76, and the first pump 28A. The controller 24, sometimes referred to in the related art as an "electronic control module," may also be used to control other components of the automatic transmission 14. Further, in one embodiment, the hydraulic control system 30 includes at least one sensor (not shown) disposed in fluid communication with the fluid line 46A and disposed in electrical communication with the controller 24 (electrical connection not shown in detail, but generally known in the art). The sensor generates a signal representing at least one of hydraulic pressure, temperature, viscosity, and/or flowrate. The controller 24 may be configured to monitor the sensor to move the pressure regulator valve 70 between the positions. In one embodiment, the sensor is a pressure transducer for generating a signal representing the hydraulic fluid pressure occurring at the fluid line 46A. While a single sensor is utilized in the representative embodiment illustrated herein, it should be appreciated that the hydraulic control system 30 could include any suitable number of sensors, of any suitable type, arranged in any suitable way, without departing from the scope of the present invention.

In addition, a method, according to the present invention, of controlling the hydraulic control system 30 for the automatic transmission 14 is provided according to the above-described description. The method includes the steps of selectively combining input fluid flow and pressure from two independent fluid sources with the four-position main pressure regulator 48 and providing output fluid flow from the four-position main pressure regulator 48 to two dependent sources of the automatic transmission 14. It should be appreciated that the method includes more specific steps as described above for the operation of the four-position main pressure regulator 48, positions of the pressure regulating valve 70, and vehicle operation.

The present invention has been described in an illustrative manner. It is to be understood that the terminology which has been used is intended to be in the nature of words of description rather than of limitation.

Many modifications and variations of the present invention are possible in light of the above teachings. Therefore, within the scope of the appended claims, the invention may be practiced other than as specifically described.

Although the present invention is defined in the attached claims, it is to be understood that the invention can alternatively also be defined in accordance with the following embodiments:

1. A hydraulic control system for use with a transmission of a vehicle powertrain system, said hydraulic control system comprising:

a four-position main pressure regulator that selectively combines input fluid flow and pressure from two independent fluid sources including a first independent fluid source and a second independent fluid source and provides output fluid flow to two dependent sources of the transmission including a first dependent source and a second dependent source.

2. The system according to embodiment 1, wherein said first dependent source comprises one of a second priority circuit and a recirculation circuit, and said second dependent source comprises the other of said second priority circuit and said recirculation circuit.

3. The system according to embodiment 2, wherein said first dependent source is said second priority circuit and said second dependent source is said recirculation circuit.

4. The system according to any one of embodiments 1 to 3, wherein said first and second independent fluid sources each independently comprise: a mechanical pump; an electric pump; or an accumulator.

5. The system according to any one of embodiments 1 to 4, wherein said four-position main pressure regulator comprises:

a housing, a first inlet port fluidly connected to said first independent fluid source, a second inlet port fluidly connected to said second independent fluid source, and a third inlet port fluidly connected to said second independent fluid source, a first outlet port fluidly connected to said first dependent source, a second outlet port fluidly connected to said first dependent source, and a third outlet port fluidly connected to said second dependent source, a movable pressure regulating valve having a plurality of lands, a pressure control solenoid for controlling said movable pressure regulating valve, and a spring for biasing said movable pressure regulating valve.

6. The system according to embodiment 5, wherein said four-position main pressure regulator is configured so that there is no fluid flow through said four-position main pressure regulator when said first, second and third inlet ports are blocked by said plurality of lands relative to said first, second and third outlet ports such that fluid is supplied to a clutch actuation circuit and/or a gear shift actuation circuit and not to said first and second dependent sources.

7. The system according to embodiment 5 or embodiment 6, wherein said four-position main pressure regulator is configured to supply fluid to a clutch actuation circuit and/or a gear shift actuation circuit and said first dependent source when said first inlet port is open to said first outlet port by said plurality of lands.

8. The system according to embodiment 7, wherein said fluid is supplied through said four-position main pressure regulator by said first independent fluid source to said first dependent source.

9. The system according to any one of embodiments 5 to 8, wherein said four-position main pressure regulator is configured to supply fluid to a clutch actuation circuit and/or a gear shift actuation circuit and said first dependent source when said first inlet port is open to said first outlet port by said plurality of lands and when said second inlet port is open to said second outlet port by said plurality of lands.

10. The system according to embodiment 9, wherein said fluid is supplied through said four-position main pressure regulator by said first independent fluid source and said second independent fluid source to said first dependent source.

11. The system according to any one of embodiments 5 to 10, wherein said four-position main pressure regulator is configured to supply fluid to a clutch actuation circuit and/or a gear shift actuation circuit, said first dependent source, and said second dependent source when said first inlet port is open to said first outlet port by said plurality of lands, when said second inlet port is open to said second outlet port by said plurality of lands, and when said third inlet port is open to said third outlet port by said plurality of lands.

12. The system according to embodiment 11, wherein said fluid is supplied through said four-position main pressure regulator by said first independent fluid source and said second independent fluid source to said first dependent source and by said second independent fluid source to said second dependent source.

13. The system according to any one of embodiments 5 to 12, wherein said four-position main pressure regulator further includes a pilot pressure area adjacent said pressure control solenoid for further biasing said movable pressure regulating valve.

14. The system according to any one of embodiments 5 to 13, wherein said four-position main pressure regulator further includes a feedback area for further biasing said movable pressure regulating valve.

15. The system according to any one of embodiments 5 to 14, wherein said four-position main pressure regulator includes only one pressure control solenoid for controlling said movable pressure regulating valve.

16. A method of controlling a hydraulic control system for use with a transmission of a vehicle powertrain system, said method comprising the steps of:
   providing a four-position main pressure regulator; and
   selectively combining input fluid flow and pressure from two independent fluid sources with the four-position main pressure regulator and providing output fluid flow from the four-position main pressure regulator to two dependent sources of the transmission.

What is claimed is:

1. A hydraulic control system for use with a transmission of a vehicle powertrain system, said hydraulic control system comprising:
   a four-position main pressure regulator that selectively combines input fluid flow and pressure from two independent fluid sources including a first independent fluid source and a second independent fluid source and provides output fluid flow to two dependent sources of the transmission including a first dependent source and a second dependent source,
   wherein said four-position main pressure regulator comprises:
      a housing,
      a first inlet port fluidly connected to said first independent fluid source, a second inlet port fluidly connected to said second independent fluid source, and a third inlet port fluidly connected to said second independent fluid source,
      a first outlet port fluidly connected to said first dependent source, a second outlet port fluidly connected to said first dependent source, and a third outlet port fluidly connected to said second dependent source,
      a movable pressure regulating valve having a plurality of lands,
      a pressure control solenoid for controlling said movable pressure regulating valve, and
      a spring for biasing said movable pressure regulating valve.

2. The system according to claim 1, wherein said first dependent source comprises one of a second priority circuit and a recirculation circuit, and said second dependent source comprises the other of said second priority circuit and said recirculation circuit.

3. The system according to claim 2, wherein said first dependent source is said second priority circuit and said second dependent source is said recirculation circuit.

4. The system according to claim 1, wherein said first and second independent fluid sources each independently comprise: a mechanical pump; or an electric pump.

5. The system according to claim 1, wherein said four-position main pressure regulator is configured so that there is no fluid flow through said four-position main pressure regulator when said first, second and third inlet ports are blocked by said plurality of lands relative to said first, second and third outlet ports such that fluid is supplied to a clutch actuation circuit and/or a gear shift actuation circuit and not to said first and second dependent sources.

6. The system according to claim 1, wherein said four-position main pressure regulator is configured to supply fluid to a clutch actuation circuit and/or a gear shift actuation circuit and said first dependent source when said first inlet port is open to said first outlet port by said plurality of lands.

7. The system according to claim 6, wherein said fluid is supplied through said four-position main pressure regulator by said first independent fluid source to said first dependent source.

8. The system according to claim 1, wherein said four-position main pressure regulator is configured to supply fluid to a clutch actuation circuit and/or a gear shift actuation circuit and said first dependent source when said first inlet port is open to said first outlet port by said plurality of lands and when said second inlet port is open to said second outlet port by said plurality of lands.

9. The system according to claim 8, wherein said fluid is supplied through said four-position main pressure regulator by said first independent fluid source and said second independent fluid source to said first dependent source.

10. The system according to claim 1, wherein said four-position main pressure regulator is configured to supply fluid to a clutch actuation circuit and/or a gear shift actuation circuit, said first dependent source, and said second dependent source when said first inlet port is open to said first outlet port by said plurality of lands, when said second inlet port is open to said second outlet port by said plurality of lands, and when said third inlet port is open to said third outlet port by said plurality of lands.

11. The system according to claim 10, wherein said fluid is supplied through said four-position main pressure regulator by said first independent fluid source and said second independent fluid source to said first dependent source and by said second independent fluid source to said second dependent source.

12. The system according to claim 1, wherein said four-position main pressure regulator further includes a pilot pressure area adjacent said pressure control solenoid for further biasing said movable pressure regulating valve.

13. The system according to claim 1, wherein said four-position main pressure regulator further includes a feedback area for further biasing said movable pressure regulating valve.

14. The system according to claim 1, wherein said four-position main pressure regulator includes only one pressure control solenoid for controlling said movable pressure regulating valve.

15. A method of controlling a hydraulic control system for use with a transmission of a vehicle powertrain system, said method comprising the steps of:

providing a four-position main pressure regulator; and
selectively combining input fluid flow and pressure from two independent fluid sources with the four-position main pressure regulator and providing output fluid flow from the four-position main pressure regulator to two dependent sources of the transmission, wherein said four-position main pressure regulator comprises:
  a housing,
  a first inlet port fluidly connected to said first independent fluid source, a second inlet port fluidly connected to said second independent fluid source, and a third inlet port fluidly connected to said second independent fluid source,
  a first outlet port fluidly connected to said first dependent source, a second outlet port fluidly connected to said first dependent source, and a third outlet port fluidly connected to said second dependent source,
  a movable pressure regulating valve having a plurality of lands,
  a pressure control solenoid for controlling said movable pressure regulating valve, and
  a spring for biasing said movable pressure regulating valve.

* * * * *